Figure 1:
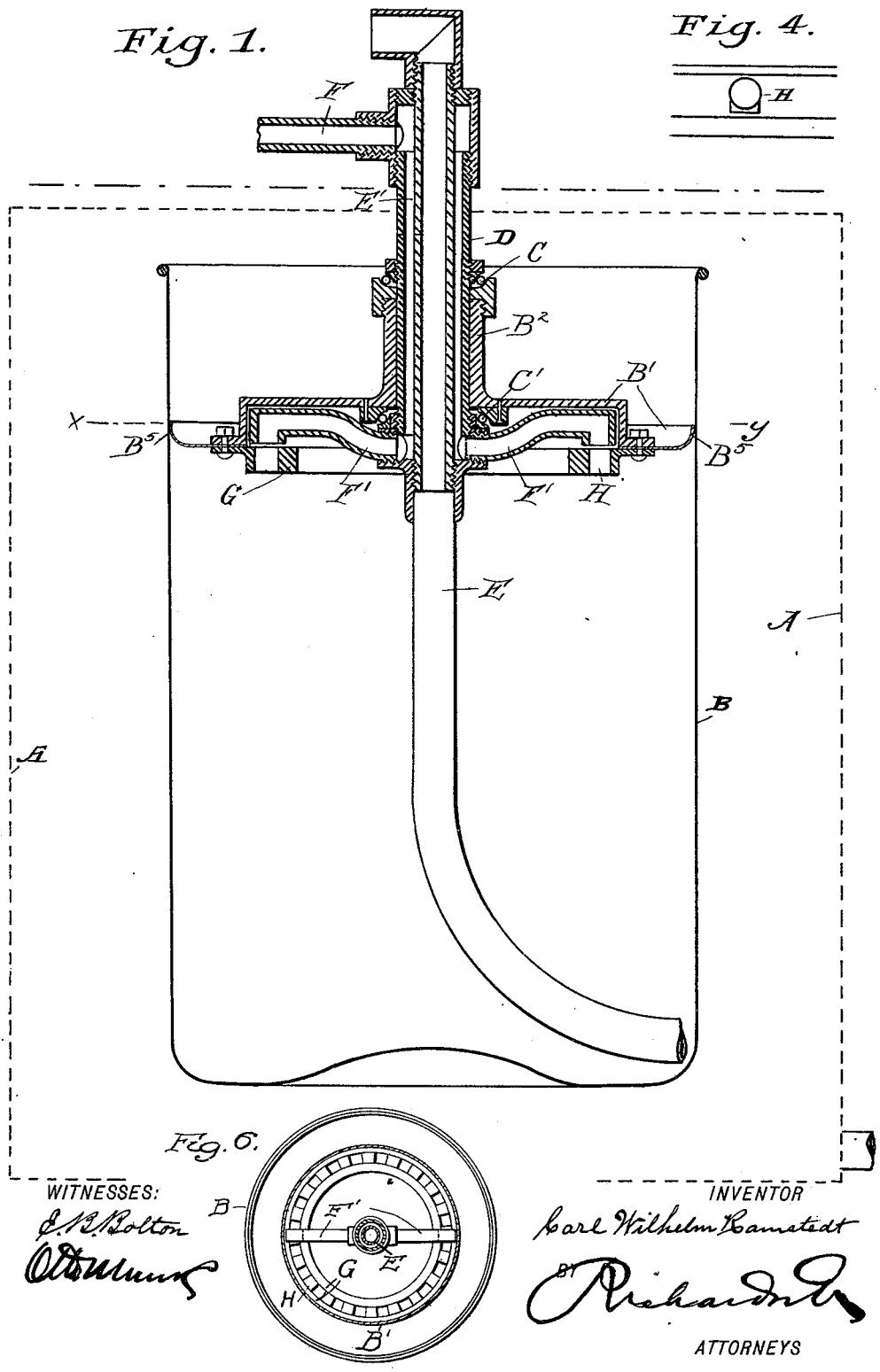

No. 672,011. Patented Apr. 16, 1901.
C. W. RAMSTEDT.
ROTATING APPARATUS FOR TEMPERING LIQUIDS.
(Application filed Dec. 6, 1897.)
(No Model.) 2 Sheets—Sheet 1.

No. 672,011. Patented Apr. 16, 1901.
C. W. RAMSTEDT.
ROTATING APPARATUS FOR TEMPERING LIQUIDS.
(Application filed Dec. 6, 1897.)
(No Model.) 2 Sheets—Sheet 2.

WITNESSES:
C. B. Bolton

INVENTOR
Carl Wilhelm Ramstedt
BY
ATTORNEYS

THE NORRIS PETERS CO., PHOTO-LITHO., WASHINGTON, D. C.

UNITED STATES PATENT OFFICE.

CARL WILHELM RAMSTEDT, OF TRANBYGGE, SWEDEN.

ROTATING APPARATUS FOR TEMPERING LIQUIDS.

SPECIFICATION forming part of Letters Patent No. 672,011, dated April 16, 1901.

Application filed December 6, 1897. Serial No. 660,945. (No model.)

*To all whom it may concern:*

Be it known that I, CARL WILHELM RAMSTEDT, a subject of the King of Sweden and Norway, and a resident of Tranbygge, Kungsängen, in the Kingdom of Sweden, have invented certain new and useful Improvements in Rotating Apparatus for Tempering Liquids, of which the following is a specification.
This invention relates to an apparatus for changing the temperature of different matters, chiefly liquids. The objects of the treatment of the liquid may vary—as, for instance, it may be to cool the liquid or to first heat and then cool it with a view to sterilizing or pasteurizing the same.

In the following specification the word "tempering" is used for brevity, but possibly somewhat improperly, to include every change of temperature of the material under treatment.

The apparatus chiefly comprises a vessel into which the liquid to be treated is poured and a rotary element placed in this vessel and consisting of a hollow body of suitable shape into which the tempering agent is introduced. The liquid in the outer vessel thus surrounds the rotating element and is thrown outward thereby, while it is by its weight brought backward toward it again, whereby other parts of the liquid come in contact with the rotating element. In this way the liquid is constantly kept in motion and fresh parts of it are constantly coming in contact with the rotating element. The rotating element is preferably driven by a small motor placed in the same and the tempering agent used as motive fluid, said agent being led under a requisite pressure to the motor.
The invention is illustrated in the accompanying drawings, in which—

Figure 2:
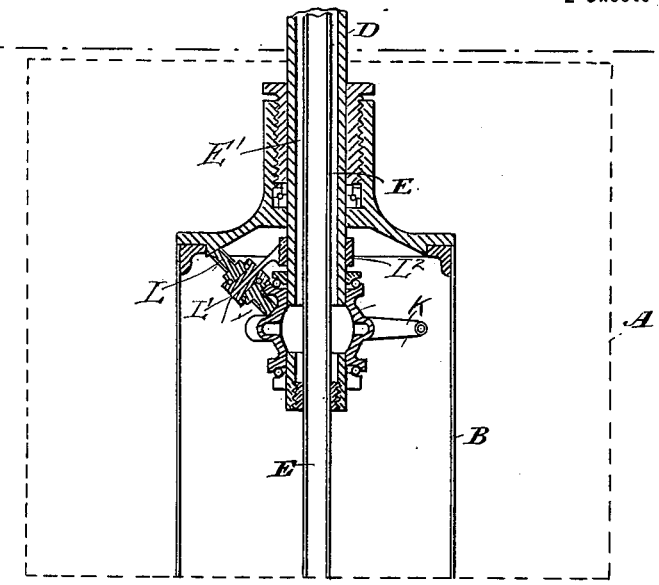
Figure 3:
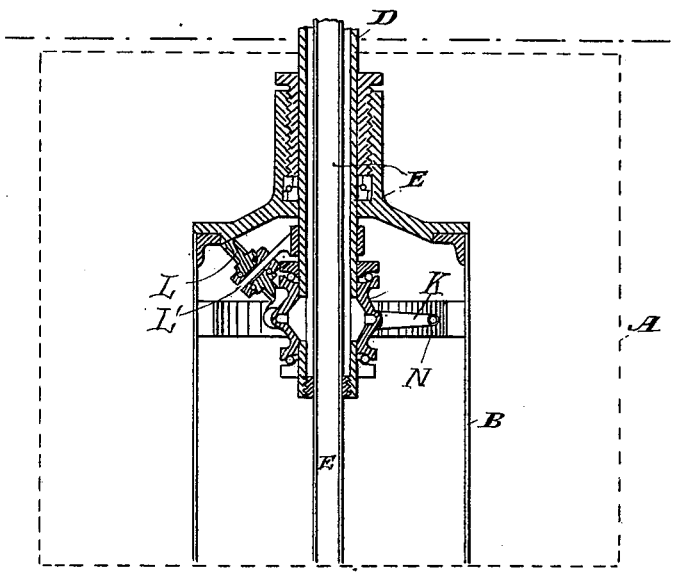
Figure 5:
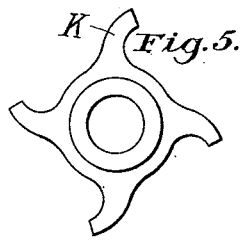

Figure 1 is a central vertical section of one form of the invention. Fig. 2 is a similar view of a modification. Fig. 3 is a sectional view of another modification. Fig. 4 is a detail top view of the motor of Fig. 1, and Fig. 5 is a detail view of the motor of Figs. 2 and 3. Fig. 6 is a section taken on lines $x\,y$ of Fig. 1, but showing the pipe E' in plan.
In the drawings, A indicates the outer vessel, and B the inner rotary element or vessel.

Referring first to Fig. 1, it will be seen that the inner element or vessel B is provided near the upper portion with a horizontal partition B', secured in any suitable manner to the wall of the vessel at $B^5$ so that the vessel and partition are rigidly united. The vessel B is rotatably suspended on the fixed tubular shaft D by means of the tubular hub $B^2$, extending upwardly from the horizontal partition B' and preferably journaled between antifriction-bearings C C' in order that the said vessel may rotate more freely on the shaft D, which is carried by some suitable support. (Not shown in the drawings.) A pipe E enters the vessel B through the shaft D and has its lower end bent so as to come into close proximity to the wall of the vessel B and also bend in the direction opposite to the direction of rotation of vessel B, so that it can catch some of the liquid contained in vessel B and rotating therewith. Between the pipe E and the surrounding portion of the shaft D is an intermediate space E' in communication at the top with a fluid-supply pipe F. At the lower end this space communicates with one or more pipes F', secured to the lower portion of shaft D.

Beneath the partition B' and held in proximity to it is a turbine ring G with vanes H, toward which vanes the downwardly-pointing orifices of pipes F' face. The tempering fluid introduced at the requisite pressure through pipe F flows down through tubular shaft D and out through pipe or pipes F'' and impinges against the turbine G, thereby rotating the latter, and with it the rotary element or vessel B. The driving fluid then descends into the vessel B and acts to heat or cool the surrounding liquid in vessel A, as the case may be. The tempering medium is withdrawn from the vessel B by pipe E, as, if steam is the heating medium, the water of condensation will be caught up by pipe E and discharged thereby.

In the form shown in Fig. 2 a turbine K, commonly called a "Scotch turbine" (shown in detail in Fig. 5,) is journaled on the shaft D. Bearing on the center of the turbine are antifriction-wheels L, journaled on pins L', projecting from a ring $L^2$, mounted on the shaft D. The vessel B rests on the wheels L, and as the turbine rotates the motion will be communicated to the vessel or element B, but in a reverse direction.

In the form shown in Fig. 3 I provide the vessel B with vanes N to receive the impact of the motive fluid issuing from the nozzles K.

Having thus described my invention, what I claim is—

1. An apparatus for tempering liquids comprising an outer stationary vessel, an inner vessel journaled therein, a supply for tempering fluid under pressure connected with said vessel, a motor interposed between said supply and vessel and operated by said fluid, said motor being operatively connected with the rotating vessel and an outlet for the tempering fluid, substantially as described.

2. An apparatus for tempering liquids comprising a stationary vessel for the liquid to be tempered, a closed inner vessel adapted to rotate therein, a fluid-motor within said vessel, a supply-pipe for supplying fluid under pressure to operate said motor and temper the liquid, and an outlet for the tempering fluid, substantially as described.

3. An apparatus for tempering liquids comprising a stationary outer vessel, an inner rotary closed vessel having a hollow shaft, a supply-pipe for supplying fluid under pressure to said hollow shaft, a fluid-motor within the vessel and adapted to operate the same, said motor being adapted to receive the motive fluid from the hollow shaft and discharge the same into said inner vessel, and an outlet-pipe extending through the hollow shaft and having a curved lower end in proximity to the bottom of said inner vessel, substantially as described.

4. In combination with the outer vessel, a stationary hollow shaft depending within the same, a closed inner vessel journaled in said hollow shaft, a supply-pipe for fluid under pressure communicating with said hollow shaft, a jet-pipe connected with said hollow shaft within the inner vessel, vanes carried by said inner vessel and adapted to receive the impact of the fluid issuing from said jet-pipe, and an exit-pipe extending through said hollow shaft, substantially as described.

5. In combination with the outer vessel, a stationary hollow shaft depending therein, an inner vessel journaled on said hollow shaft, a horizontal partition closing the open end of said inner vessel, a supply-pipe for fluid under pressure connected with said hollow shaft, a jet-pipe extending horizontally from said shaft, a circular series of vanes carried by said partition in line with said jet-pipe, and an exit-pipe extending through said hollow shaft, substantially as described.

In witness whereof I have hereunto signed my name in the presence of two subscribing witnesses.

CARL WILHELM RAMSTEDT.

Witnesses:
ERNST SVANGVIST,
CARL P. GERELL.